US012565423B2

(12) United States Patent
Malatak

(10) Patent No.: US 12,565,423 B2
(45) Date of Patent: Mar. 3, 2026

(54) PROCESS FOR PRODUCING HYDROGEN FROM NATURAL GAS

(71) Applicant: Valero Services, Inc., San Antonio, TX (US)

(72) Inventor: William A. Malatak, San Antonio, TX (US)

(73) Assignee: Valero Services, Inc., San Antonio, TX (US)

( * ) Notice: Subject to any disclaimer, the term of this patent is extended or adjusted under 35 U.S.C. 154(b) by 216 days.

(21) Appl. No.: 18/102,058

(22) Filed: Jan. 26, 2023

(65) Prior Publication Data

US 2024/0253985 A1    Aug. 1, 2024

(51) Int. Cl.
| *C01B 3/24* | (2006.01) |
| *B01D 53/14* | (2006.01) |
| *C01B 3/12* | (2006.01) |
| *C01B 3/36* | (2006.01) |
| *C01B 3/48* | (2006.01) |

(52) U.S. Cl.
CPC ............ *C01B 3/24* (2013.01); *B01D 53/1425* (2013.01); *B01D 53/1475* (2013.01); *C01B 3/12* (2013.01); *C01B 3/36* (2013.01); *C01B 3/48* (2013.01); *B01D 2252/202* (2013.01); *B01D 2256/16* (2013.01); *B01D 2257/504* (2013.01); *C01B 2203/0255* (2013.01); *C01B 2203/0415* (2013.01); *C01B 2203/0475* (2013.01); *C01B 2203/08* (2013.01); *C01B 2203/1241* (2013.01)

(58) Field of Classification Search
CPC .... C01B 3/24; C01B 3/12; C01B 3/36; C01B 3/48; C01B 2203/0475; C01B 2203/08; B01D 53/1425; B01D 53/1475; B01D 2252/202; B01D 2256/16; B01D 2257/504

USPC .......................................................... 423/655
See application file for complete search history.

(56) References Cited

U.S. PATENT DOCUMENTS

| 6,818,198 B2 | 11/2004 | Singh et al. |
| 6,846,404 B2 | 1/2005 | O'Rear |
| 6,863,879 B2 | 3/2005 | Rojey et al. |
| 6,887,908 B1 | 5/2005 | Pruet |
| 7,148,261 B2 | 12/2006 | Hershkowitz et al. |
| 7,183,328 B2 | 2/2007 | Hershkowitz et al. |
| 7,214,721 B2 | 5/2007 | Eastland |
| 7,226,548 B2 | 6/2007 | Xie et al. |
| 7,238,215 B2 | 7/2007 | Gauthier et al. |
| 7,467,519 B2 | 12/2008 | Raybold et al. |
| 7,485,767 B2 | 2/2009 | Lattner et al. |

(Continued)

FOREIGN PATENT DOCUMENTS

| WO | WO-2007/134075 A3 | 11/2007 |
| WO | WO-2010/143980 A1 | 12/2010 |

(Continued)

OTHER PUBLICATIONS

Voldsund et al., "Hydrogen production with CO2 capture", International Journal of Hydrogen Energy 41 (2016) 4969-4992. (Year: 2016).*

*Primary Examiner* — Anita Nassiri-Motlagh
(74) *Attorney, Agent, or Firm* — Foley & Lardner LLP

(57) ABSTRACT

A method of producing hydrogen from methane and renewable hydrocarbons is disclosed. The method includes producing hydrogen with a lower carbon life cycle emission score by utilizing (1) a blend of renewable feedstocks and natural gas and (2) a carbon dioxide recovery and sequestration process.

15 Claims, 3 Drawing Sheets

(56) References Cited

U.S. PATENT DOCUMENTS

| | | | |
|---|---|---|---|
| 7,534,276 | B2 | 5/2009 | Licht et al. |
| 7,540,893 | B2 | 6/2009 | Liu et al. |
| 7,556,736 | B2 | 7/2009 | Price et al. |
| 7,638,070 | B2 | 12/2009 | Johnson et al. |
| 7,670,586 | B2 | 3/2010 | Wang et al. |
| 7,673,685 | B2 | 3/2010 | Huntley Shaw et al. |
| 7,674,443 | B1 | 3/2010 | Davis |
| 7,677,309 | B2 | 3/2010 | Shaw et al. |
| 7,731,923 | B2 | 6/2010 | Marty et al. |
| 7,740,829 | B2 | 6/2010 | Becker et al. |
| 7,753,973 | B2 | 7/2010 | Galloway |
| 7,772,292 | B2 | 8/2010 | Jenkins et al. |
| 7,829,602 | B2 | 11/2010 | Litt et al. |
| 7,837,975 | B2 | 11/2010 | Iyer et al. |
| 7,846,979 | B2 | 12/2010 | Rojey et al. |
| 7,849,691 | B2 | 12/2010 | Faulkner et al. |
| 7,871,449 | B2 | 1/2011 | Key et al. |
| 7,881,825 | B2 | 2/2011 | Esposito et al. |
| 7,909,898 | B2 | 3/2011 | White et al. |
| 7,931,888 | B2 | 4/2011 | Drnevich et al. |
| 7,968,757 | B2 | 6/2011 | Abhari et al. |
| 7,985,399 | B2 | 7/2011 | Drnevich et al. |
| 8,021,577 | B2 | 9/2011 | Johnson et al. |
| 8,080,070 | B2 | 12/2011 | Grover |
| 8,100,996 | B2 | 1/2012 | Simmons et al. |
| 8,106,102 | B2 | 1/2012 | Steynberg et al. |
| 8,124,049 | B2 | 2/2012 | Grover |
| 8,129,436 | B2 | 3/2012 | Tirtowidjojo et al. |
| 8,133,463 | B1 | 3/2012 | Berry et al. |
| 8,163,809 | B2 | 4/2012 | Chaubey et al. |
| 8,168,687 | B2 | 5/2012 | Chaubey et al. |
| 8,202,914 | B2 | 6/2012 | Chen et al. |
| 8,217,210 | B2 | 7/2012 | Agrawal et al. |
| 8,241,600 | B1 | 8/2012 | Berry et al. |
| 8,268,898 | B2 | 9/2012 | Yagi et al. |
| 8,303,923 | B2 | 11/2012 | Han |
| 8,354,457 | B2 | 1/2013 | Ernst |
| 8,388,864 | B2 | 3/2013 | Bormann et al. |
| 8,431,755 | B2 | 4/2013 | Vauk |
| 8,479,833 | B2 | 7/2013 | Raman |
| 8,479,834 | B2 | 7/2013 | Preston |
| 8,506,915 | B2 | 8/2013 | Abanades Garcia et al. |
| 8,518,155 | B2 | 8/2013 | Palamara et al. |
| 8,529,865 | B2 | 9/2013 | Belt et al. |
| 8,535,638 | B2 | 9/2013 | Terrien et al. |
| 8,545,727 | B2 | 10/2013 | Filippi et al. |
| 8,567,200 | B2 | 10/2013 | Brook et al. |
| 8,568,493 | B2 | 10/2013 | Cheiky et al. |
| 8,591,861 | B2 | 11/2013 | Lomax et al. |
| 8,592,492 | B2 | 11/2013 | Chakravarti et al. |
| 8,636,923 | B2 | 1/2014 | Paquet et al. |
| 8,652,223 | B2 | 2/2014 | Allam |
| 8,658,554 | B2 | 2/2014 | Dorner et al. |
| 8,692,034 | B2 | 4/2014 | Han |
| 8,709,112 | B2 | 4/2014 | Hilton et al. |
| 8,733,459 | B2 | 5/2014 | Wallace |
| 8,747,806 | B2 | 6/2014 | Catchpole |
| 8,769,961 | B2 | 7/2014 | Allam |
| 8,771,386 | B2 | 7/2014 | Licht et al. |
| 8,809,603 | B2 | 8/2014 | Corradini et al. |
| 8,834,834 | B2 | 9/2014 | Paquet et al. |
| 8,852,456 | B2 | 10/2014 | Valentin et al. |
| 8,858,900 | B2 | 10/2014 | Galloway |
| 8,920,526 | B1 | 12/2014 | Siefert et al. |
| 8,940,949 | B2 | 1/2015 | Miller |
| 9,006,297 | B2 | 4/2015 | Herrmann |
| 9,011,560 | B2 | 4/2015 | Simmons et al. |
| 9,028,794 | B2 | 5/2015 | Darde et al. |
| 9,062,257 | B1 | 6/2015 | Agee et al. |
| 9,085,513 | B2 | 7/2015 | Dahl |
| 9,085,785 | B2 | 7/2015 | Reed et al. |
| 9,096,802 | B2 | 8/2015 | Eilos et al. |
| 9,115,045 | B2 | 8/2015 | Chakravarti et al. |
| 9,132,402 | B2 | 9/2015 | Singh et al. |
| 9,145,525 | B2 | 9/2015 | Chakravarti et al. |
| 9,163,185 | B2 | 10/2015 | Steele et al. |
| 9,169,443 | B2 | 10/2015 | Kresnyak |
| 9,174,844 | B2 | 11/2015 | Ramkumar et al. |
| 9,260,303 | B2 | 2/2016 | Filippi et al. |
| 9,260,666 | B2 | 2/2016 | Aelion et al. |
| 9,266,730 | B2 | 2/2016 | Kresnyak |
| 9,272,959 | B2 | 3/2016 | Moon et al. |
| 9,278,328 | B2 | 3/2016 | Schlichting et al. |
| 9,295,961 | B2 | 3/2016 | Laska et al. |
| 9,296,671 | B2 | 3/2016 | Stuckert et al. |
| 9,321,643 | B2 | 4/2016 | Denis et al. |
| 9,327,972 | B2 | 5/2016 | Allam |
| 9,328,291 | B2 | 5/2016 | Steve |
| 9,340,494 | B2 | 5/2016 | Iaquaniello et al. |
| 9,340,732 | B2 | 5/2016 | Steve |
| 9,359,268 | B2 | 6/2016 | Cheiky et al. |
| 9,365,131 | B2 | 6/2016 | Jamal et al. |
| 9,365,783 | B2 | 6/2016 | Lang |
| 9,416,077 | B2 | 8/2016 | Kelfkens et al. |
| 9,434,615 | B2 | 9/2016 | Kukkonen et al. |
| 9,475,696 | B2 | 10/2016 | Mabrouk et al. |
| 9,512,004 | B2 | 12/2016 | Lang et al. |
| 9,561,968 | B2 | 2/2017 | Singh et al. |
| 9,562,203 | B1 | 2/2017 | Siefert et al. |
| 9,562,472 | B2 | 2/2017 | Kelly et al. |
| 9,598,290 | B2 | 3/2017 | Iaquaniello et al. |
| 9,624,441 | B2 | 4/2017 | Lissianski et al. |
| 9,643,843 | B2 | 5/2017 | Morgenroth et al. |
| 9,651,313 | B2 | 5/2017 | Trainham et al. |
| 9,657,240 | B2 | 5/2017 | Wagner et al. |
| 9,663,363 | B2 | 5/2017 | Simmons et al. |
| 9,677,005 | B1 | 6/2017 | Agee et al. |
| 9,677,092 | B2 | 6/2017 | Datta et al. |
| 9,701,910 | B2 | 7/2017 | Bashir et al. |
| 9,738,579 | B2 | 8/2017 | Lucas et al. |
| 9,764,277 | B2 | 9/2017 | Jewell et al. |
| 9,771,531 | B2 | 9/2017 | Kelfkens et al. |
| 9,786,940 | B2 | 10/2017 | Langley |
| 9,806,364 | B2 | 10/2017 | Jamal et al. |
| 9,834,728 | B2 | 12/2017 | Fleckner et al. |
| 9,873,836 | B2 | 1/2018 | Blommel et al. |
| 9,890,041 | B2 | 2/2018 | Christensen et al. |
| 9,890,098 | B2 | 2/2018 | Wix et al. |
| 9,908,776 | B2 | 3/2018 | Wolf et al. |
| 9,914,883 | B2 | 3/2018 | Dutta et al. |
| 9,920,267 | B2 | 3/2018 | Chandran et al. |
| 9,920,268 | B2 | 3/2018 | Chandran et al. |
| 9,938,144 | B2 | 4/2018 | Maass et al. |
| 9,969,666 | B1 | 5/2018 | Roesch et al. |
| 9,987,620 | B2 | 6/2018 | Basini et al. |
| 10,008,730 | B2 | 6/2018 | Jamal et al. |
| 10,011,785 | B2 | 7/2018 | Eilos |
| 10,040,951 | B2 | 8/2018 | Risseeuw et al. |
| 10,077,235 | B2 | 9/2018 | Erlandsson et al. |
| 10,087,074 | B2 | 10/2018 | Filippi et al. |
| 10,087,140 | B2 | 10/2018 | Erlandsson et al. |
| 10,118,823 | B2 | 11/2018 | Kelly et al. |
| 10,144,000 | B2 | 12/2018 | Goyal et al. |
| 10,160,704 | B2 | 12/2018 | Roesch et al. |
| 10,173,895 | B2 | 1/2019 | Ostuni et al. |
| 10,195,615 | B2 | 2/2019 | Baxter et al. |
| 10,196,266 | B2 | 2/2019 | Lindell |
| 10,196,348 | B2 | 2/2019 | Iaquaniello et al. |
| 10,197,329 | B2 | 2/2019 | Baxter et al. |
| 10,207,924 | B2 | 2/2019 | Spitzl |
| 10,213,731 | B2 | 2/2019 | Baxter et al. |
| 10,214,418 | B2 | 2/2019 | Chandran et al. |
| 10,218,020 | B2 | 2/2019 | Jamal et al. |
| 10,240,119 | B2 | 3/2019 | Bradin et al. |
| 10,259,708 | B2 | 4/2019 | Gronemann et al. |
| 10,283,795 | B2 | 5/2019 | Jamal et al. |
| 10,293,297 | B2 | 5/2019 | Baxter et al. |
| 10,307,709 | B2 | 6/2019 | Baxter et al. |
| 10,328,384 | B2 | 6/2019 | Baxter et al. |
| 10,344,232 | B2 | 7/2019 | Lucas et al. |
| 10,392,250 | B2 | 8/2019 | Fusselman et al. |
| 10,443,005 | B2 | 10/2019 | Wormser et al. |
| 10,443,838 | B2 | 10/2019 | Baxter |
| 10,449,478 | B2 | 10/2019 | Baxter et al. |

(56) References Cited

U.S. PATENT DOCUMENTS

| | | | |
|---|---|---|---|
| 10,458,704 | B2 | 10/2019 | Baxter et al. |
| 10,494,257 | B2 | 12/2019 | Sozinho et al. |
| 10,533,812 | B2 | 1/2020 | Baxter et al. |
| 10,537,828 | B2 | 1/2020 | Baxter et al. |
| 10,543,456 | B2 | 1/2020 | Baxter et al. |
| 10,549,229 | B2 | 2/2020 | Baxter et al. |
| 10,563,916 | B2 | 2/2020 | Baxter et al. |
| 10,590,866 | B2 | 3/2020 | Magnusson et al. |
| 10,622,656 | B2 | 4/2020 | Al Hunaidy et al. |
| 10,633,250 | B2 | 4/2020 | Ott et al. |
| 10,647,573 | B2 | 5/2020 | Mortensen et al. |
| 10,710,893 | B2 | 7/2020 | Ostuni et al. |
| 10,737,225 | B2 | 8/2020 | Baxter et al. |
| 10,739,067 | B2 | 8/2020 | Baxter et al. |
| 10,760,018 | B2 | 9/2020 | Tiverios et al. |
| 10,800,655 | B2 | 10/2020 | Chandran et al. |
| 10,816,264 | B2 | 10/2020 | Filippi et al. |
| 10,822,234 | B2 | 11/2020 | Kelly et al. |
| 10,865,351 | B2 | 12/2020 | Shrivastava et al. |
| 10,870,810 | B2 | 12/2020 | Steill et al. |
| 10,889,496 | B2 | 1/2021 | Aasberg-Petersen et al. |
| 10,894,714 | B2 | 1/2021 | Tadiello et al. |
| 10,954,449 | B2 | 3/2021 | Cohn et al. |
| 10,961,121 | B2 | 3/2021 | Kong et al. |
| 10,962,499 | B2 | 3/2021 | Silvester et al. |
| 10,998,566 | B2 | 5/2021 | Al Hunaidy et al. |
| 11,002,481 | B2 | 5/2021 | Baxter et al. |
| 11,014,812 | B2 | 5/2021 | Tadiello et al. |
| 11,077,418 | B2 | 8/2021 | Wegeng et al. |
| 11,130,680 | B2 | 9/2021 | Han et al. |
| 11,130,681 | B2 | 9/2021 | Han et al. |
| 11,155,468 | B2 | 10/2021 | Ostuni et al. |
| 11,235,974 | B2 | 2/2022 | Polster et al. |
| 11,254,876 | B2 | 2/2022 | Cohn et al. |
| 11,261,086 | B2 | 3/2022 | Ingham et al. |
| 11,274,039 | B2 | 3/2022 | Chen et al. |
| 11,274,321 | B2 | 3/2022 | Reed et al. |
| 11,292,717 | B2 | 4/2022 | Vicari et al. |
| 11,299,686 | B2 | 4/2022 | Foody et al. |
| 11,318,417 | B2 | 5/2022 | Baxter |
| 11,333,625 | B2 | 5/2022 | Jones et al. |
| 11,370,660 | B2 | 6/2022 | Aasberg-Petersen et al. |
| 11,408,672 | B2 | 8/2022 | Costa De Beauregard et al. |
| 11,420,868 | B2 | 8/2022 | Mortensen |
| 11,447,389 | B2 | 9/2022 | Mortensen et al. |
| 11,459,926 | B2 | 10/2022 | Staller et al. |
| 11,466,223 | B2 | 10/2022 | Chandran et al. |
| 11,485,637 | B2 | 11/2022 | Coleman et al. |
| 11,505,755 | B2 | 11/2022 | Steill et al. |
| 2007/0212286 | A1 * | 9/2007 | Shah ........................ C01B 32/50 |
| | | | 423/220 |
| 2007/0256361 | A1 | 11/2007 | Kindig |
| 2009/0293723 | A1 * | 12/2009 | Steele ................ B01D 53/1425 |
| | | | 95/174 |
| 2010/0043279 | A1 * | 2/2010 | Abhari ........................ C10L 3/12 |
| | | | 44/308 |
| 2010/0083566 | A1 | 4/2010 | Fredriksen et al. |
| 2012/0095118 | A1 * | 4/2012 | Bracht ..................... C10G 2/32 |
| | | | 518/703 |
| 2013/0130345 | A1 | 5/2013 | Thai et al. |
| 2015/0148553 | A1 | 5/2015 | Miller |
| 2015/0376801 | A1 | 12/2015 | Bairamijamal |
| 2016/0304787 | A1 | 10/2016 | Aelion et al. |
| 2017/0058222 | A1 | 3/2017 | Lucas et al. |
| 2017/0130582 | A1 | 5/2017 | Hsu |
| 2019/0001256 | A1 * | 1/2019 | Wen ................... B01D 53/1462 |
| 2019/0337801 | A1 | 11/2019 | Ulber et al. |
| 2020/0038844 | A1 | 2/2020 | Herskowitz et al. |
| 2020/0048086 | A1 | 2/2020 | Moore |
| 2020/0109051 | A1 | 4/2020 | Aasberg-Petersen et al. |
| 2020/0165128 | A1 | 5/2020 | Basin et al. |
| 2020/0223692 | A1 | 7/2020 | Hamzehlouia et al. |
| 2020/0307997 | A1 | 10/2020 | Tranier |
| 2020/0317514 | A1 | 10/2020 | Mortensen et al. |
| 2020/0354216 | A1 | 11/2020 | Mortensen |

| | | | |
|---|---|---|---|
| 2020/0377365 | A1 | 12/2020 | Mortensen et al. |
| 2020/0392420 | A1 | 12/2020 | Tiverios et al. |
| 2020/0406212 | A1 | 12/2020 | Mortensen et al. |
| 2021/0061656 | A1 | 3/2021 | O'Neal et al. |
| 2021/0101797 | A1 | 4/2021 | Tadiello et al. |
| 2021/0102753 | A1 | 4/2021 | Costa De Beauregard et al. |
| 2021/0121854 | A1 | 4/2021 | Zhou et al. |
| 2021/0139794 | A1 | 5/2021 | Mukthiyar et al. |
| 2021/0171345 | A1 | 6/2021 | Marker et al. |
| 2021/0245139 | A1 | 8/2021 | Seabaugh et al. |
| 2021/0284925 | A1 | 9/2021 | Gao et al. |
| 2021/0300757 | A1 | 9/2021 | Tadiello et al. |
| 2021/0317375 | A1 | 10/2021 | Greager et al. |
| 2021/0317377 | A1 | 10/2021 | Foody et al. |
| 2021/0355392 | A1 | 11/2021 | Greager et al. |
| 2021/0371278 | A1 | 12/2021 | Costa De Beauregard et al. |
| 2021/0371362 | A1 | 12/2021 | Early et al. |
| 2021/0380427 | A1 | 12/2021 | Han et al. |
| 2021/0380428 | A1 | 12/2021 | Han et al. |
| 2021/0388278 | A1 | 12/2021 | De Klerk et al. |
| 2021/0394151 | A1 | 12/2021 | Katikaneni et al. |
| 2022/0017826 | A1 | 1/2022 | Galloway |
| 2022/0081291 | A1 | 3/2022 | Mortensen |
| 2022/0081626 | A1 | 3/2022 | Myllyoja et al. |
| 2022/0089437 | A1 | 3/2022 | Shrivastava et al. |
| 2022/0098036 | A1 | 3/2022 | Chandran et al. |
| 2022/0112429 | A1 | 4/2022 | Greager et al. |
| 2022/0119255 | A1 | 4/2022 | Mortensen |
| 2022/0119715 | A1 | 4/2022 | Greager et al. |
| 2022/0135893 | A1 | 5/2022 | Trapp et al. |
| 2022/0144632 | A1 | 5/2022 | Chinta et al. |
| 2022/0144654 | A1 | 5/2022 | Ingham et al. |
| 2022/0162067 | A1 | 5/2022 | Mortensen et al. |
| 2022/0169503 | A1 | 6/2022 | Mortensen et al. |
| 2022/0185753 | A1 | 6/2022 | Early |
| 2022/0204429 | A1 | 6/2022 | Early |
| 2022/0234019 | A1 | 7/2022 | Ruggeri et al. |
| 2022/0234975 | A1 | 7/2022 | Ridley, Jr. et al. |
| 2022/0235275 | A1 | 7/2022 | Iversen et al. |
| 2022/0251455 | A1 | 8/2022 | Schuetzle et al. |
| 2022/0259131 | A1 | 8/2022 | Amakawa et al. |
| 2022/0298430 | A1 | 9/2022 | Roy et al. |
| 2022/0298441 | A1 | 9/2022 | Foody |
| 2022/0306463 | A1 | 9/2022 | Cruz et al. |
| 2022/0306464 | A1 | 9/2022 | Cruz et al. |
| 2022/0306467 | A1 | 9/2022 | Mortensen et al. |
| 2022/0306468 | A1 | 9/2022 | Cady et al. |
| 2022/0306559 | A1 | 9/2022 | Mortensen et al. |
| 2022/0315434 | A1 | 10/2022 | Walter et al. |
| 2022/0324708 | A1 | 10/2022 | Manenti et al. |
| 2022/0325186 | A1 | 10/2022 | Cohn et al. |
| 2022/0325218 | A1 | 10/2022 | Conrado et al. |
| 2022/0352721 | A1 | 11/2022 | Scheiff et al. |
| 2022/0363537 | A1 | 11/2022 | Mortensen et al. |

FOREIGN PATENT DOCUMENTS

| | | | |
|---|---|---|---|
| WO | WO-2021/110524 A1 | 6/2021 | |
| WO | WO-2021/110667 A1 | 6/2021 | |
| WO | WO-2021/119610 A1 | 6/2021 | |
| WO | WO-2021/217269 A1 | 11/2021 | |
| WO | WO-2021/262692 A1 | 12/2021 | |
| WO | WO-2021250083 A1 * | 12/2021 | |
| WO | WO-2022/034147 A1 | 2/2022 | |
| WO | WO-2022/034283 A1 | 2/2022 | |
| WO | WO-2022/034284 A1 | 2/2022 | |
| WO | WO-2022/034285 A1 | 2/2022 | |
| WO | WO-2022/035450 A1 | 2/2022 | |
| WO | WO-2022/045891 A2 | 3/2022 | |
| WO | WO-2022/049147 A1 | 3/2022 | |
| WO | WO-2022/049148 A1 | 3/2022 | |
| WO | WO-2022/051573 A1 | 3/2022 | |
| WO | WO-2022/066829 A1 | 3/2022 | |
| WO | WO-2022/074356 A1 | 4/2022 | |
| WO | WO-2022/078915 A1 | 4/2022 | |
| WO | WO-2022/079002 A1 | 4/2022 | |
| WO | WO-2022/079098 A1 | 4/2022 | |
| WO | WO-2022/084436 A1 | 4/2022 | |
| WO | WO-2022/112311 A1 | 6/2022 | |

(56)            References Cited

FOREIGN PATENT DOCUMENTS

| | | | |
|---|---|---|---|
| WO | WO-2022/137138 | A1 | 6/2022 |
| WO | WO-2022/155425 | A1 | 7/2022 |
| WO | WO-2022/157223 | A1 | 7/2022 |
| WO | WO-2022/159408 | A1 | 7/2022 |
| WO | WO-2022/167288 | A1 | 8/2022 |
| WO | WO-2022/169536 | A1 | 8/2022 |
| WO | WO-2022/171643 | A1 | 8/2022 |
| WO | WO-2022/171906 | A2 | 8/2022 |
| WO | WO-2022/185205 | A1 | 9/2022 |
| WO | WO-2022/200532 | A1 | 9/2022 |
| WO | WO-2022/213053 | A1 | 10/2022 |
| WO | WO-2022/213054 | A1 | 10/2022 |
| WO | WO-2022/217286 | A1 | 10/2022 |
| WO | WO-2022/223458 | A1 | 10/2022 |
| WO | WO-2022/232936 | A1 | 11/2022 |
| WO | WO-2022/238899 | A1 | 11/2022 |

* cited by examiner

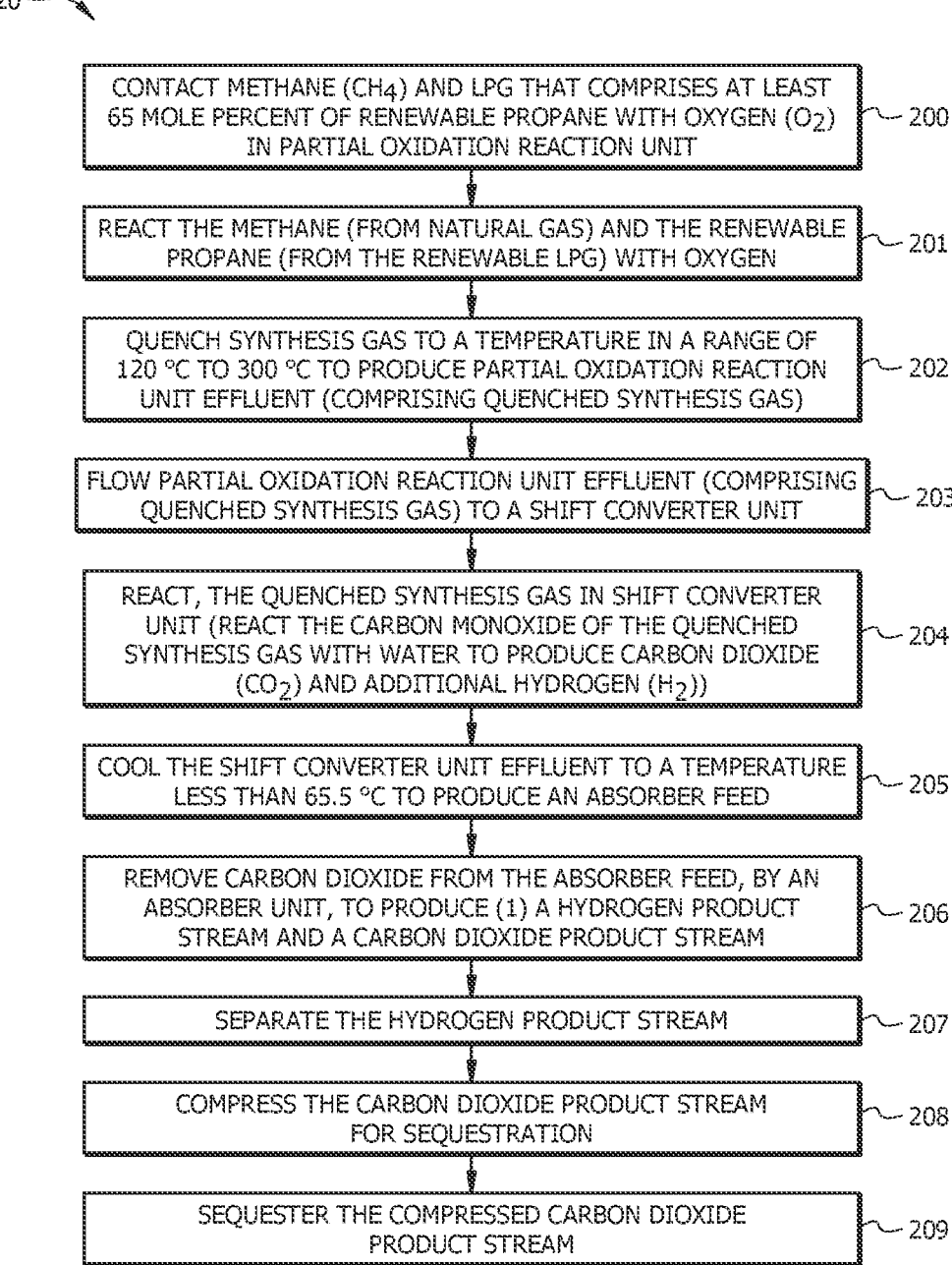

20

CONTACT METHANE ($CH_4$) AND LPG THAT COMPRISES AT LEAST 65 MOLE PERCENT OF RENEWABLE PROPANE WITH OXYGEN ($O_2$) IN PARTIAL OXIDATION REACTION UNIT — 200

REACT THE METHANE (FROM NATURAL GAS) AND THE RENEWABLE PROPANE (FROM THE RENEWABLE LPG) WITH OXYGEN — 201

QUENCH SYNTHESIS GAS TO A TEMPERATURE IN A RANGE OF 120 °C TO 300 °C TO PRODUCE PARTIAL OXIDATION REACTION UNIT EFFLUENT (COMPRISING QUENCHED SYNTHESIS GAS) — 202

FLOW PARTIAL OXIDATION REACTION UNIT EFFLUENT (COMPRISING QUENCHED SYNTHESIS GAS) TO A SHIFT CONVERTER UNIT — 203

REACT, THE QUENCHED SYNTHESIS GAS IN SHIFT CONVERTER UNIT (REACT THE CARBON MONOXIDE OF THE QUENCHED SYNTHESIS GAS WITH WATER TO PRODUCE CARBON DIOXIDE ($CO_2$) AND ADDITIONAL HYDROGEN ($H_2$)) — 204

COOL THE SHIFT CONVERTER UNIT EFFLUENT TO A TEMPERATURE LESS THAN 65.5 °C TO PRODUCE AN ABSORBER FEED — 205

REMOVE CARBON DIOXIDE FROM THE ABSORBER FEED, BY AN ABSORBER UNIT, TO PRODUCE (1) A HYDROGEN PRODUCT STREAM AND A CARBON DIOXIDE PRODUCT STREAM — 206

SEPARATE THE HYDROGEN PRODUCT STREAM — 207

COMPRESS THE CARBON DIOXIDE PRODUCT STREAM FOR SEQUESTRATION — 208

SEQUESTER THE COMPRESSED CARBON DIOXIDE PRODUCT STREAM — 209

*FIG. 2*

PROCESS FOR PRODUCING HYDROGEN FROM NATURAL GAS

CROSS REFERENCE TO RELATED APPLICATIONS

None.

FIELD OF THE INVENTION

The present invention relates to systems and methods for producing hydrogen. More specifically, the present invention relates to systems and methods for producing hydrogen from natural gas/methane and renewable propane.

BACKGROUND

Hydrogen is widely consumed in petroleum refineries. In these refineries, the hydrogen is used, for example, to hydrotreat and/or hydrocrack heavy and/or high sulfur oils to produce lighter and cleaner products. Further, hydrogen is emerging as a significant low-carbon energy source. These varied demands for hydrogen have engendered well established hydrogen production processes such as steam reforming and partial oxidation.

Steam reforming involves reacting light hydrocarbons such as methane to form hydrogen and carbon monoxide. Steam methane reforming involves using high-temperature steam to react with methane to produce hydrogen, carbon monoxide, and some carbon dioxide (carbon dioxide and carbon monoxide are collectively referred to herein as carbon oxides). The reaction is endothermic. The produced carbon monoxide is then reacted with steam in a water-gas shift reaction to produce more hydrogen.

Partial oxidation involves reacting light hydrocarbons with oxygen to produce hydrogen, carbon monoxide, carbon dioxide, and water. Partial oxidation can be used to produce hydrogen from a range of materials including natural gas, liquid petroleum gas (LPG), naphtha, fuel oil, asphalt, coal, and coke. In partial oxidation, a limited amount of oxygen is allowed to react with the hydrocarbon, for example methane, such that the oxygen supplied is insufficient to fully oxidize the methane to carbon dioxide and water; instead, the methane is partially oxidized to form hydrogen and carbon monoxide. The carbon monoxide can then be reacted with water to produce more hydrogen in a water-gas shift reaction.

In the United States, approximately 95% of the hydrogen produced is by steam reforming and approximately 4% is by partial oxidation. Considering the preeminence of steam reforming in the production of hydrogen, it should be noted that steam reforming is energy intensive and causes the release of carbon dioxide to the atmosphere. It is estimated that the amount of carbon dioxide produced and emitted in steam reforming is about seven to twelve times the amount of hydrogen produced by weight. Further, approximately 99% of the hydrogen produced in the United States is from fossil fuels. Accordingly, there is a drive to produce hydrogen from a diverse set of resources and to do so via a near net-zero-carbon pathway or in a manner such that hydrogen of low carbon life cycle emission is produced.

BRIEF SUMMARY OF THE INVENTION

The present inventor has discovered a method of producing hydrogen with a low life cycle carbon dioxide emission equivalent, by reacting a mixture of natural gas, oxygen, and renewable propane, in a process involving partial oxidation. The production process reduces the carbon life cycle emission of the hydrogen product, as compared with conventional processes, by using renewable raw material feeds and adopting carbon dioxide sequestration for the carbon dioxide generated in the process. Specifically, the process involves capturing and permanently sequestering at least 85% of the feed carbon in the form of carbon dioxide. On implementation of the process, the hydrogen product will have a carbon life cycle emission less than 1.5 Kg carbon dioxide equivalent per Kg of hydrogen.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mole percent" refer to a weight, volume, or molar percentage of a component, respectively, based on the total weight, the total volume, or the total moles of material that includes the component. In a non-limiting example, 10 moles of component in 100 moles of the material is 10 mole percent of component.

The term "substantially" and its variations are defined to include ranges within 10%, within 5%, within 1%, or within 0.5%.

The terms "inhibiting" or "reducing" or "preventing" or "avoiding" or "restricting" or any variation of these terms, when used in the claims and/or the specification, include any measurable decrease or complete inhibition to achieve a desired result.

The term "effective," as that term is used in the specification and/or claims, means adequate to accomplish a desired, expected, or intended result.

The term "$C_n+$ hydrocarbon" wherein n is a positive integer, e.g. 1, 2, 3, 4, or 5, as that term is used in the specification and/or claims, means any hydrocarbon having at least n number of carbon atom(s) per molecule.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

The term "primarily," as that term is used in the specification and/or claims, means greater than any of 50 wt. %, 50 mole percent, and 50 vol. %. For example, "primarily" may include 50.1 wt. % to 100 wt. % and all values and ranges there between, 50.1 mole percent to 100 mole percent and all values and ranges there between, or 50.1 vol. % to 100 vol. % and all values and ranges there between.

The term "renewable hydrocarbon" as that term is used in the specification and/or claims, means a non-fossil hydrocarbon that is produced from one or more of the following renewable raw materials: a vegetable oil, a soybean oil, used cooking oil, a tallow, and other triglyceride and fatty acid components. For example, "renewable propane" as that term is used in the specification and/or claims, means non-fossil propane that is produced from one or more of: a vegetable oil, a soybean oil, used cooking oil, a tallow, and other triglyceride and fatty acid components.

The term "carbon life cycle emission," which can also be referred to as lifecycle greenhouse gas emission, as that term is used in the specification and/or claims, means kilograms $CO_2e$ emitted per kilogram of hydrogen produced.

The term "$CO_2e$," or carbon dioxide equivalent, as that term is used in the specification and/or claims, is a term for describing different greenhouse gases in a common unit, wherein $CO_2e$ represents the amount of carbon dioxide as compared with the emissions from other greenhouse gases on the basis of the global warming potential, by converting amounts of other gases to the equivalent amount of carbon dioxide with the same global warming potential.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE FIGURES

FIG. 2 shows a method of producing hydrogen, according to embodiments of the invention.

DETAILED DESCRIPTION

Embodiments of the invention described herein involve a novel process that produces hydrogen with a low carbon life cycle emission. According to embodiments of the invention, hydrogen is produced with a carbon life cycle emission score that is significantly lower than hydrogen produced from natural gas by conventional processes. The lower carbon life cycle emission score for producing hydrogen is achieved, at least in part, by utilizing (1) a blend of renewable propane and natural gas as raw material and (2) a carbon dioxide recovery and sequestration process.

Figure 1:
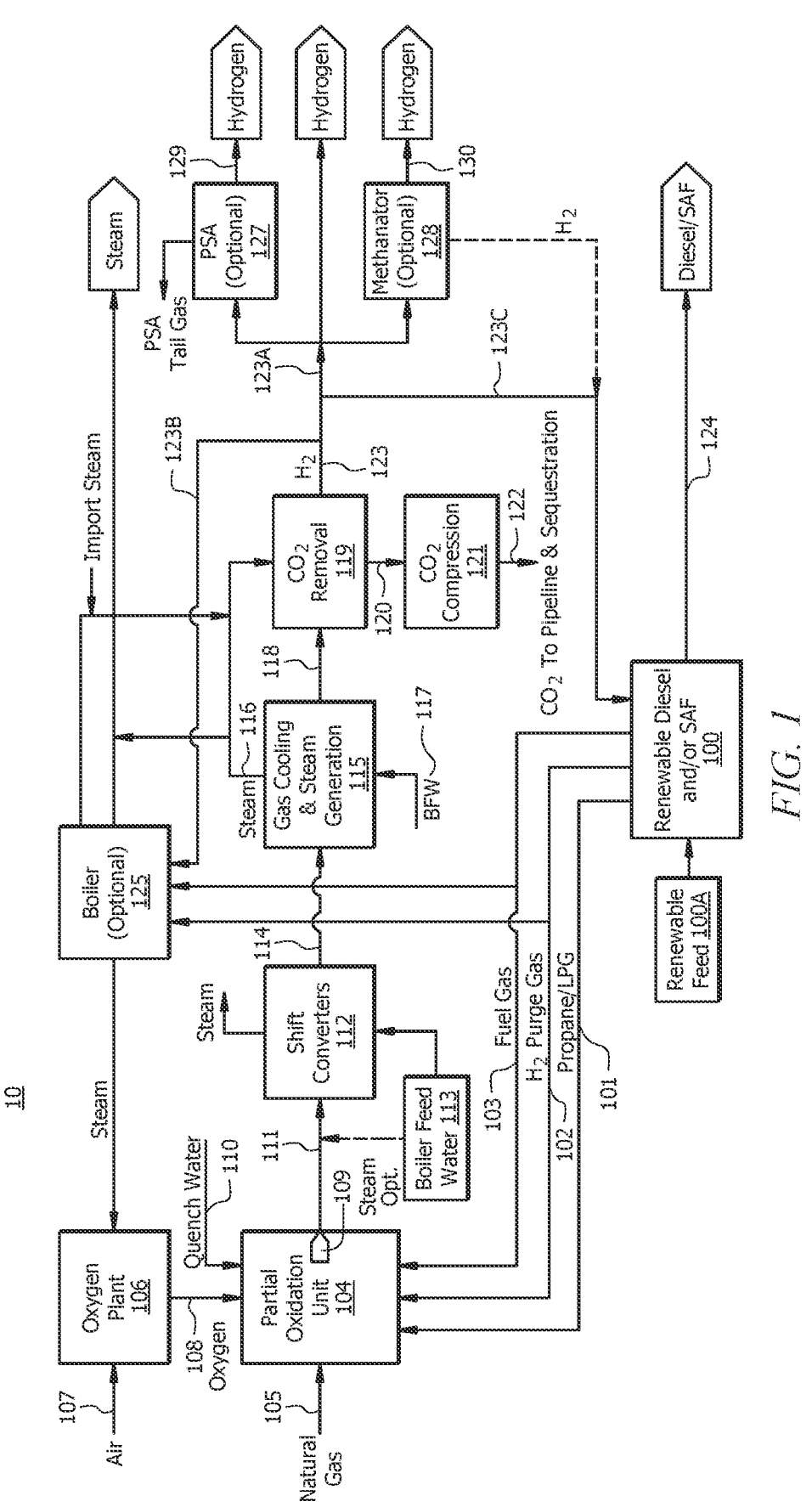
FIG. 1 shows a system for producing hydrogen, according to embodiments of the invention.
Figure 3:
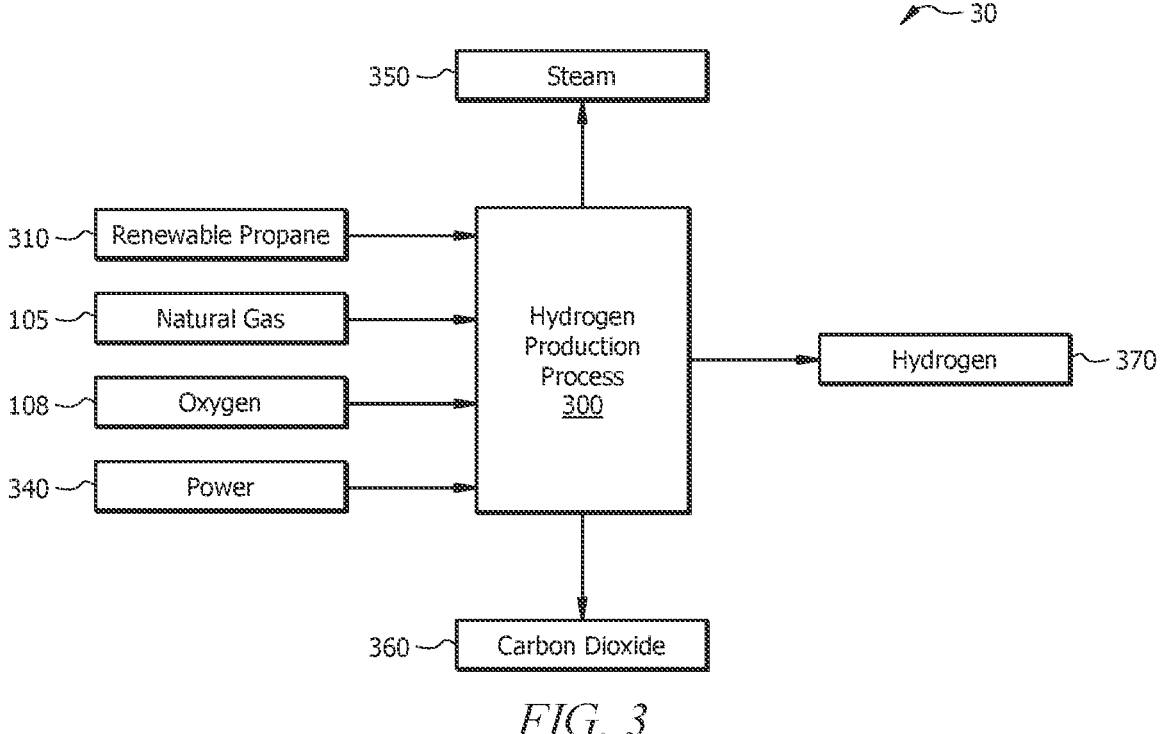
FIG. 3 shows a process of producing hydrogen, according to embodiments of the invention.

FIG. 1 shows system 10 for producing hydrogen, according to embodiments of the invention. FIG. 2 shows method 20 for producing hydrogen, according to embodiments of the invention. System 10, in embodiments of the invention, may be used to implement method 20. FIG. 3 shows process 30 for producing hydrogen, according to embodiments of the invention, such that the carbon life cycle emission is less than 1.5 Kg carbon dioxide equivalent per Kg of hydrogen. System 10 and method 20, in embodiments of the invention, may be used to implement process 30.

System for Producing Hydrogen

According to embodiments of the invention, system 10 includes renewable product unit 100, which is adapted to produce renewable fuel 124, such as renewable diesel and/or sustainable aviation fuel (SAF) and/or synthetic paraffinic kerosene (SPK). Byproducts of the process carried out in renewable product unit 100 includes (a) renewable LPG 101, which comprises renewable propane, (b) hydrogen purge gas 102, and (c) fuel gas 103, according to embodiments of the invention. In embodiments of the invention, system 10 includes partial oxidation reaction unit 104, which is adapted to receive natural gas 105, renewable LPG 101, hydrogen purge gas 102, fuel gas 103, and oxygen 108; and with all these materials, partial oxidation reaction unit 104 is adapted to carry out a partial oxidation reaction to produce synthesis gas 109, comprising carbon monoxide (CO) and hydrogen ($H_2$). In embodiments of the invention, fuel gas 103 comprises at least 20 weight percent propane and at least 20 weight percent hydrogen. In system 10, oxygen 108, according to embodiments of the invention, is provided by oxygen plant 106 which is adapted to separate oxygen from air 107 to produce oxygen 108. Partial oxidation reaction unit 104, in embodiments of the invention, is adapted to quench and/or cool synthesis gas 109, for example by using quench water 110, to produce quenched synthesis gas, which along with quench water 110, is included in partial oxidation reaction unit effluent 111; additionally or alternatively, steam may be added to synthesis gas 109 prior to it entering shift converter unit 112 to produce partial oxidation reaction unit effluent 111. In embodiments of the invention, system 10 includes shift converter unit 112, which is adapted to receive partial oxidation reaction unit effluent 111 (which comprises the quenched synthesis gas) and react, within shift converter unit 112, carbon monoxide with boiler feed water 113 to form carbon dioxide and additional hydrogen, wherein shift converter unit effluent 114 has more molecular or free hydrogen by weight than molecular or free hydrogen in partial oxidation reaction unit effluent 111. According to embodiments of the invention, system 10 includes gas cooling and steam generation unit 115, which is adapted to cool shift converter unit effluent 114 by transferring heat to boiler feed water 117, to produce absorber feed 118 and steam 116. System 10, in embodiments of the invention also includes absorber unit 119, which is adapted to remove carbon dioxide from absorber feed 118 to produce hydrogen product stream 123 and carbon dioxide product stream 120.

According to embodiments of the invention, system 10 includes carbon dioxide compression unit 121, which is adapted to compress carbon dioxide product stream 120 to produce compressed carbon dioxide product stream 122. Hydrogen product stream 123, according to embodiments of the invention, can be split into final hydrogen product stream 123A, hydrogen fuel product stream 123B (for providing fuel to boiler 125), and hydrogen fuel product stream 123C (to be used as a reactant or fuel in renewable product unit 100). In embodiments of the invention, system 10 includes boiler 125, which is adapted to produce steam for, at least, oxygen plant 106.

In embodiments of the invention, system 10 includes (1) pressure swing absorber unit 127, which is adapted to remove impurities from at least a portion of final hydrogen product stream 123A to produce first purified hydrogen product stream 129 and/or (2) methanation unit 128, which is adapted to convert carbon monoxide and carbon dioxide in at least a portion of final hydrogen product stream 123A to produce second purified hydrogen product stream 130 comprising methane (i.e., reducing the carbon oxide content).

Method for Producing Hydrogen

According to embodiments of the invention, method 20 includes, at block 200, contacting methane ($CH_4$) and LPG, where the LPG comprises at least 65 mole percent of renewable propane with oxygen in partial oxidation reaction unit 104, wherein the ratio of methane to renewable propane (methane:renewable propane) in the partial oxidation reaction unit is in a range of 2:1 to 12:1. The contacting of methane and LPG with oxygen, in embodiments of the invention, can be carried out by flowing, to partial oxidation reaction unit 104, (1) renewable LPG 101, which is obtained from renewable product unit 100 (which produces renewable fuel 124), (2) natural gas 105, which comprises methane, and (3) oxygen 108. Renewable LPG 101, in embodiments of the invention, may be a liquid which is vaporized prior to flowing it to partial oxidation reaction unit 104. In embodiments of the invention, renewable LPG 101 is 3 to 9 wt. % of renewable feed 100A used to produce renewable fuel 124. Renewable LPG 101, in embodiments of the invention, is a mixture made up of at least 90 weight percent of components from the group of: hydrogen, methane, ethane, propane, butanes, pentanes, hexanes, and heptanes.

Block 201, in embodiments of the invention, involves reacting the methane (from natural gas 105) and the renewable propane (from the renewable LPG 101) with oxygen 108, where the molar ratio of mono atomic oxygen to carbon is greater than 0.7 and less than 1.4, in partial oxidation reaction unit 104, wherein reaction conditions include a temperature in a range of 900° C. and 1500° C., including ranges of 900° C. to 950° C., 950° C. to 1000° C., 1000° C. to 1050° C., 1050° C. to 1100° C., 1100° C. to 1150° C., 1150° C. to 1200° C., 1200° C. to 1250° C., 1250° C. to 1300° C., 1300° C. to 1350° C., 1350° C. to 1400° C., 1400° C. to 1450° C., and 1450° C. to 1500° C., and a pressure in a range of 20 Bar and 120 Bar, including ranges of 20 Bar to 30 Bar, 30 Bar to 40 Bar, 40 Bar to 50 Bar, 50 Bar to 60 Bar, 60 Bar to 70 Bar, 70 Bar to 80 Bar, 80 Bar to 90 Bar, 90 Bar to 100 Bar, 100 Bar to 110 Bar, and 110 Bar to 120 Bar, to produce synthesis gas 109, comprising carbon monoxide (CO) and hydrogen ($H_2$), having a molar ratio of $H_2$ to CO greater than 1.5 and less than 2.5, and comprising less than 2 mole percent methane. In embodiments of the invention, partial oxidation reaction unit 104 is operated so that it has a space velocity sufficient to convert at least 96 wt. % of the methane of natural gas 105 and renewable LPG 101, collectively, to produce synthesis gas 109.

According to embodiments of the invention, method 20 includes, at block 202, quenching/cooling synthesis gas 109, in partial oxidation reaction unit 104 using quench water 110, to a temperature in a range of 120° C. to 300° C. to produce partial oxidation reaction unit effluent 111, which comprises a quenched synthesis gas and quench water 110. And at block 203, in embodiments of the invention, method 20 involves flowing partial oxidation reaction unit effluent 111 to shift converter unit 112.

Block 204, according to embodiments of the invention, includes reacting, in shift converter unit 112, the carbon monoxide of the quenched synthesis gas in partial oxidation reaction unit effluent 111 with boiler feed water 113 to produce carbon dioxide ($CO_2$) and additional hydrogen ($H_2$), such that shift converter unit effluent 114 comprises more molecular or free hydrogen by weight than molecular or free hydrogen in partial oxidation reaction unit effluent 111, wherein the conversion of carbon monoxide in the quenched synthesis gas is greater than 92 percent and the carbon monoxide content of shift converter unit effluent 114 is less than 3 percent.

In embodiments of the invention, method 20, includes, at block 205, cooling shift converter unit effluent 114 to a temperature less than 65.5° C. to produce absorber feed 118. According to embodiments of the invention, the cooling of shift converter unit effluent 114 is carried out in a series of heat exchangers in gas cooling and steam generation unit 115, thereby recovering heat; and using the recovered heat to heat one or more streams in system 10 or other industrial/refinery processes. Block 206, in embodiments of the invention, involves removing carbon dioxide from absorber feed 118, by absorber unit 119 to produce (1) hydrogen product stream 123, comprising 88 to 100 mole percent hydrogen and less than 0.6 mole percent carbon monoxide and (2) carbon dioxide product stream 120, comprising 85 to 100 mole percent carbon dioxide. In embodiments of the invention, block 206 can include contacting absorber feed 118 with a carbon dioxide lean absorbent in absorber unit 119 to produce a carbon dioxide rich absorbent, wherein the carbon dioxide lean absorbent is selected from the list consisting of: alcohol, amine, and ether and wherein the carbon rich absorbent is a mixture of the carbon dioxide lean absorbent and absorbed carbon dioxide. Block 206 can further include, flowing the carbon dioxide rich absorbent to a regeneration unit (not shown) and heating the carbon dioxide rich absorbent such that carbon dioxide is released from the carbon dioxide rich absorbent, thereby forming carbon dioxide product stream 120 and the carbon dioxide lean absorbent, and flowing the carbon dioxide lean absorbent to absorber unit 119 for reuse. According to embodiments of the invention, the recovered heat from gas cooling and steam generation unit 115 is used in the regeneration unit for heating of the carbon dioxide rich absorbent. In embodiments of the invention, when the carbon dioxide lean absorbent is alcohol, the carbon dioxide product stream leaving the regeneration unit is at a pressure greater than 6 Bar.

In embodiments of the invention, at block 207, method 20 includes separating hydrogen product stream 123 into, final hydrogen product stream 123A, hydrogen fuel product stream 123B, and hydrogen fuel product stream 123C. As shown in FIG. 1, hydrogen fuel product stream 123B can be used as fuel in boiler 125 and hydrogen fuel product stream 123C can be used as fuel or reactant in renewable product unit 100. As further shown in FIG. 1, in embodiments of the invention, a portion of final hydrogen product stream 123A, can be flowed to pressure swing absorber unit 127, where pressure swing absorber unit 127 removes impurities from the portion of final hydrogen product stream 123A to produce first purified hydrogen product stream 129 comprising at least 99.9 mole percent hydrogen. Embodiments of the invention can also include flowing a portion of final hydrogen product stream 123A to a methanation unit 128 and reacting carbon monoxide and carbon dioxide from a portion of final hydrogen product stream 123A to produce methane and thereby reducing the carbon oxide content such that the carbon oxide comprised in second purified hydrogen product stream 130 is below 0.15 mole percent. According to embodiments of the invention, any of final hydrogen product stream 123A, first purified hydrogen product stream 129, and second purified hydrogen product stream 130 can be used for a variety of refining processes, including, but not limited to, hydrotreating, hydrocracking, power generation, and/or steam generation.

According to embodiments of the invention, method 20 includes, at block 208, compressing carbon dioxide product stream 120 for sequestration to a pressure greater than 60 Bar and thereby forming compressed carbon dioxide product stream 122.

According to embodiments of the invention, the power used to compress the carbon dioxide product stream to a sequestration pressure is below 120 kW-hrs per metric ton of carbon dioxide. Block 209, in embodiments of the invention, involves sequestering compressed carbon dioxide product stream 122. The sequestering at block 209 can include sequestering of compressed carbon dioxide product stream 122 such that at least 85% of carbon atoms contained in the synthesis gas is sequestered. According to embodiments of the invention, implementation of blocks 200 to 209 results in hydrogen of hydrogen product stream 123 having a carbon life cycle emission less than 1.5 Kg of carbon dioxide equivalent per Kg of hydrogen.

According to embodiments of the invention, process 30, as depicted in FIG. 3, can be implemented to achieve a carbon life cycle emission of less than 1.5 Kg carbon dioxide equivalent per Kg of hydrogen produced; and such carbon life cycle emission can be calculated using the elements of process 30 depicted in FIG. 3. Process 30, in embodiments of the invention, involves providing renewable propane 310, natural gas 105, oxygen 108, and power 340 to hydrogen production process 300. Hydrogen production process 300, according to embodiments of the invention, produces hydrogen 370, steam 350, and carbon dioxide 360. In embodiments of the invention, steam 350 may be exported to other processes or units and thus can replace the use of steam produced by burning fossil fuels-thereby providing a deduction to the carbon life cycle emissions calculation. Further, according to embodiments of the invention, carbon dioxide 360 is removed from hydrogen production process 300 and is available for sequestration. Once carbon dioxide 360 is sequestered, according to embodiments of the invention, this will also serve as a deduction to the carbon life cycle emission for hydrogen production process 300. As such, the carbon life cycle emission may be calculated by adding the life cycle carbon dioxide input equivalents, namely renewable propane 310, natural gas 105, oxygen 108, and power 340, subtracting life cycle carbon dioxide equivalent of steam 350 and sequestered carbon dioxide 360, then dividing by produced hydrogen 370.

Prophetic Examples

Tables 1-4 below show prophetic examples of hydrogen production utilizing one or more elements of hydrogen production process 300. Table 4 (Natural Gas, Renewable Propane, and Carbon Dioxide Sequestration) shows expected results for process 30, according to embodiments of the invention, which includes the use of natural gas 105, oxygen 108, power 340, and renewable propane 310; the exporting of steam; and the sequestration of carbon dioxide.

By way of example, the calculations of carbon life cycle emission with respect to Table 4 is as follows. The following values for the inputs to hydrogen production process 300 are estimated at: 101,000 Kg/day $CO_2$e for renewable propane 310, 723,000 Kg/day $CO_2$e for natural gas 105, 75,000 Kg/day $CO_2$e for oxygen 108, and 84,000 Kg/day $CO_2$e for power 340. And assuming that steam 350 is exported for use in other industrial/refinery units to offset the burning of fossil fuels, steam 350 is estimated at 83,000 Kg/day $CO_2$e. Carbon dioxide 360 is presumed to have been sequestered and is estimated at 865,000 Kg/day $CO_2$. The exported steam 350 and the sequestered carbon dioxide 360 will then be a $CO_2$ credit for hydrogen production process 300, and subtracted from the $CO_2$ equivalent inputs, which results in 35,000 Kg/day $CO_2$e from the production of 100,000 Kg/day of hydrogen ($H_2$). By dividing the resultant carbon dioxide equivalent for the process by the produced hydrogen, the carbon life cycle emission would be estimated at 0.35 Kg $CO_2$e/Kg $H_2$ for hydrogen production process 300. In embodiments of the present invention, the carbon life cycle emission of hydrogen production process 300 is less than 1.5 Kg $CO_2$e/Kg $H_2$. The above calculations applies in a similar manner to Tables 1-3.

Tables 1-3 show prophetic examples of hydrogen production utilizing only some of the elements of hydrogen production process 300 and shows that the resulting carbon life cycle emission score would be above 1.5 Kg $CO_2$e/Kg $H_2$. Table 1 (Natural Gas) shows expected results for a hydrogen production process that involves the use of natural gas 105, oxygen 108, power 340, and where steam is exported, but does not include the use of renewable propane 310 or carbon dioxide sequestration. As shown in Table 1, the resulting carbon life cycle emission in this scenario would be 10.7 Kg $CO_2$e/Kg $H_2$.

Table 2 (Natural Gas with Carbon dioxide Sequestration) shows expected results for a hydrogen production process that involves the use of natural gas 105, oxygen 108, power 340, the exporting of steam, and the sequestration of carbon dioxide, but does not include the use of renewable propane 310. As shown in Table 2, the resulting carbon life cycle emission in this scenario would be 2.93 Kg $CO_2$e/Kg $H_2$.

Table 3 (Natural Gas and Renewable Propane) shows expected results for a hydrogen production process that involves the use of natural gas 105, oxygen 108, power 340, renewable propane 310, and the exporting of steam, but does not include the sequestration of carbon dioxide. As shown in Table 3, the resulting carbon life cycle emission in this scenario would be 8.58 Kg $CO_2$e/Kg $H_2$.

In sum, Tables 1-4 illustrate that it is by a combination of all of the elements natural gas, renewable propane, carbon dioxide sequestration, and power that the lowest carbon life cycle emission can be achieved of the various possible combinations of these elements.

TABLE 1

| Natural Gas | | | |
| --- | --- | --- | --- |
| Hydrogen Production - 100,000 Kg/Day | | Carbon Life Cycle Emission = 10.7 Kg $CO_2$e/Kg H2 | |
| Stream | Flow Rate | CO2 Equivalent Inputs | $CO_2$e Credits |
| Natural Gas | 16 MMSCFD | 1,044,000 Kg/Day | — |
| Renewable Propane | 0 BPD | 0 Kg/Day | — |
| Oxygen | 393 Tonnes/Day | 75,000 Kg/Day | — |

TABLE 1-continued

| Natural Gas | | | |
| --- | --- | --- | --- |
| Hydrogen Production - 100,000 Kg/Day | | Carbon Life Cycle Emission = 10.7 Kg $CO_2$e/Kg H2 | |
| Stream | Flow Rate | CO2 Equivalent Inputs | $CO_2$e Credits |
| Power | 3.2 MW | 34,000 Kg/Day | — |
| Export Steam | 513,000 Kg/Day | 0 Kg/Day | 83,000 Kg/Day |
| CO2 to Sequestration | 0 Kg/Day | 0 Kg/Day | 0 Kg/Day |
| Total | | 1,153,000 Kg/Day | 83,000 Kg/Day |

TABLE 2

| Natural Gas with CO2 Sequestration | | | |
| --- | --- | --- | --- |
| Hydrogen Production - 100,000 Kg/Day | | Carbon Life Cycle Emission = 2.93 Kg $CO_2$e/Kg H2 | |
| Stream | Flow Rate | CO2 Equivalent Inputs | $CO_2$e Credits |
| Natural Gas | 16 MMSCFD | 1,044,000 Kg/Day | — |
| Renewable Propane | 0 BPD | 0 Kg/Day | — |
| Oxygen | 393 Tonnes/Day | 75,000 Kg/Day | — |
| Power | 8 MW | 82,000 Kg/Day | — |
| Export Steam | 513,000 Kg/Day | — | 83,000 Kg/Day |
| CO2 to Sequestration | 825,000 Kg/Day | — | 825,000 Kg/Day |
| Total | | 1,201,000 Kg/Day | 908,000 Kg/Day |

TABLE 3

| Natural Gas and Renewable Propane | | | |
| --- | --- | --- | --- |
| Hydrogen Production - 100,000 Kg/Day | | Carbon Life Cycle Emission = 8.58 Kg $CO_2$e/Kg H2 | |
| Stream | Flow Rate | CO2 Equivalent Inputs | $CO_2$e Credits |
| Natural Gas | 11.1 MMSCFD | 723,000 Kg/Day | — |
| Renewable Propane | 1240 BPD | 101,000 Kg/Day | — |
| Oxygen | 393 Tonnes/Day | 75,000 Kg/Day | — |
| Power | 3.1 MW | 43,000 Kg/Day | — |
| Export Steam | 512,000 Kg/Day | — | 84,000 Kg/Day |
| CO2 to Sequestration | 0 Kg/Day | — | 0 Kg/Day |
| Total | | 942,000 Kg/Day | 84,000 Kg/Day |

TABLE 4

| Natural Gas and Renewable Propane with CO2 Sequestration | | | |
| --- | --- | --- | --- |
| Hydrogen Production - 100,000 Kg/Day | | Carbon Life Cycle Emission = 0.35 Kg $CO_2$e/Kg H2 | |
| Stream | Flow Rate | CO2 Equivalent Inputs | $CO_2$e Credits |
| Natural Gas | 11.1 MMSCFD | 723,000 Kg/Day | — |
| Renewable Propane | 1240 BPD | 101,000 Kg/Day | — |
| Oxygen | 393 Tonnes/Day | 75,000 Kg/Day | — |
| Power | 8 MW | 84,000 Kg/Day | — |
| Export Steam | 511,000 Kg/Day | — | 83,000 Kg/Day |
| CO2 to Sequestration | 865,000 Kg/Day | — | 865,000 Kg/Day |
| Total | | 983,000 Kg/Day | 948,000 Kg/Day |

In the context of the present invention, at least the following 20 embodiments are described. Embodiment 1 is a method of producing hydrogen. The method comprises contacting methane ($CH_4$) and LPG, where the LPG comprises at least 65 mole percent of renewable propane with oxygen in a partial oxidation reaction unit, wherein the mole ratio of methane to renewable propane (methane:renewable propane) in the partial oxidation reaction unit is in a range of 2:1 to 12:1. The method further comprises reacting the methane and the renewable propane with the oxygen, wherein the molar ratio of mono atomic oxygen to carbon is greater than 0.7 and less than 1.4, in the partial oxidation reaction unit, wherein reaction conditions include a temperature in a range of 900° C. to 1500° C. and a pressure in a range of 20 Bar to 120 Bar to produce a synthesis gas comprising carbon monoxide (CO) and hydrogen ($H_2$), wherein the synthesis gas has a molar ratio of $H_2$ to CO greater than 1.5 and less than 2.5, and containing less than 2 mole percent methane. The method still further comprises quenching the synthesis gas to a temperature in a range of 120° C. to 300° C. to produce a quenched synthesis gas, and flowing the quenched synthesis gas to a shift converter unit. In addition, the method comprises reacting, in the shift converter unit, the carbon monoxide of the quenched synthesis gas with water to produce carbon dioxide ($CO_2$) and additional hydrogen ($H_2$) such that a shift converter unit effluent comprises more hydrogen by weight than hydrogen in the quenched synthesis gas, wherein the conversion of carbon monoxide in the quenched synthesis gas is greater than 92 percent and the carbon monoxide content of the shift converter unit effluent is less than 3 percent. The method also comprises cooling the shift converter unit effluent to a temperature less than 65.5° C. to produce an absorber feed and removing carbon dioxide from the absorber feed, in an absorber unit, to produce (1) a hydrogen product stream comprising 88 to 100 mole percent hydrogen and less than 0.6 mole percent carbon monoxide and (2) a carbon dioxide product stream comprising 85 to 100 mole percent carbon dioxide. The method yet further comprises compressing the carbon dioxide product stream for sequestration to a pressure greater than 60 Bar, and sequestering the carbon dioxide product stream, wherein the hydrogen of the hydrogen product stream has a carbon life cycle emission less than 1.5 Kg of carbon dioxide equivalent per Kg of hydrogen. Embodiment 2 is the method of embodiment 1, wherein the sequestering of the carbon dioxide product stream results in at least 85% of carbon atoms contained in the synthesis gas being sequestered. Embodiment 3 is the method of embodiment 1, wherein the LPG is a liquid byproduct of a process that produces a renewable fuel. Embodiment 4 is the method of embodiment 3, wherein the renewable fuel comprises renewable diesel and/or sustainable aviation fuel (SAF). Embodiment 5 is the method of embodiment 3, wherein the LPG is 3 to 12 wt. % of renewable feed used to produce the renewable fuel. Embodiment 6 is the method of embodiment 1 wherein the partial oxidation reaction unit is operated such that it has a space velocity sufficient to convert at least 96 mole percent of the methane and LPG, collectively, to produce the synthesis gas. Embodiment 7 is the method of embodiment 1, wherein the cooling of the shift converter unit effluent is carried out in a series of heat exchangers, thereby recovering heat, and using the recovered heat to heat one or more streams. Embodiment 8 is the method of embodiment 7, wherein the absorber feed is contacted with a carbon dioxide lean absorbent in the absorber unit to produce a carbon dioxide rich absorbent, wherein the carbon dioxide lean absorbent is selected from the list consisting of alcohol, amine, and ether and wherein the carbon dioxide rich absorbent comprises a mixture of the carbon dioxide lean absorbent and absorbed carbon dioxide. Embodiment 9 is the method of embodiment 8 further comprising flowing the carbon dioxide rich absorbent to a regeneration unit, heating the carbon dioxide rich absorbent such that carbon dioxide is released from the carbon dioxide rich absorbent and thereby forming the carbon dioxide product stream and carbon dioxide lean absorbent, and flowing the carbon dioxide lean absorbent to the absorber unit for reuse. Embodiment 10 is the method of embodiment 9, wherein the recovered heat is used in the regeneration unit for the heating of the carbon dioxide rich absorbent. Embodiment 11 is the method of embodiment 9, wherein the lean absorbent is alcohol and the carbon dioxide product stream leaving the regeneration unit is at a pressure greater than 6 Bar. Embodiment 12 is the method of embodiment 1, wherein power used to compress the carbon dioxide product stream to a sequestration pressure is below 120 kW-hrs per metric ton of carbon dioxide. Embodiment 13 is the method of embodiment 1, further comprising flowing at least a portion of the hydrogen product stream to a pressure swing absorber unit, and removing, by the pressure swing absorber unit, impurities from the at least a portion of the hydrogen product stream to produce a purified hydrogen product stream comprising at least 99.9 mole percent hydrogen. Embodiment 14 is the method of embodiment 1, further comprising flowing at least a portion of the hydrogen product stream to a methanation unit, and reacting carbon monoxide and carbon dioxide in the at least a portion of the hydrogen product stream to produce methane and thereby reducing the carbon monoxide and carbon dioxide content to below 0.15 mole percent.

Embodiment 15 is a method of producing a low carbon life cycle emission hydrogen. The method comprises contacting methane ($CH_4$) and a renewable propane, where the renewable propane comprises at least 50 mole percent of renewable propane, with oxygen in a partial oxidation reaction unit, wherein the ratio of methane to renewable propane (methane:renewable propane) in the partial oxidation reaction unit is in a range of 2:1 to 12:1. The method further comprises reacting the methane and the renewable propane with the oxygen, wherein the molar ratio of mono atomic oxygen to carbon is greater than 0.7 and less than 1.4, in the partial oxidation reaction unit, wherein reaction conditions include a temperature in a range of 900° C. to 1500° C. and a pressure in a range of 20 Bar to 120 Bar to produce a synthesis gas comprising carbon monoxide (CO) and hydrogen ($H_2$), having a molar ratio of $H_2$ to CO greater than 1.5 and less than 2.5, and containing less than 2 percent methane. The method still further comprises quenching the synthesis gas to a temperature in a range of 120° C. to 300° C. to produce a quenched synthesis gas, and flowing the quenched synthesis gas to a shift converter unit. In addition, the method comprises reacting, in the shift converter unit, the carbon monoxide of the quenched synthesis gas with water to produce carbon dioxide ($CO_2$) and additional hydrogen ($H_2$) such that a shift converter unit effluent comprises more hydrogen by weight than hydrogen in the quenched synthesis gas, wherein the conversion of carbon monoxide in the quenched synthesis gas is greater than 92 percent and the carbon monoxide content of the shift converter unit effluent is less than 3 percent. The method also comprises cooling the shift converter unit effluent to a temperature less than 65.5° C. to produce an absorber feed, and removing carbon dioxide from the absorber feed, in an absorber unit, to produce (1) a hydrogen product stream comprising a low carbon life cycle emission hydrogen having 88 to 100 mole percent hydrogen and less than 0.6 mole percent carbon monoxide and (2) a carbon dioxide product stream comprising 85 to 100 mole percent carbon dioxide. The method yet further comprises compressing the carbon dioxide product stream to a pressure greater than 60 bar sufficient for sequestration, and sequestering the carbon dioxide product stream, wherein the low carbon life cycle emission hydrogen of the hydrogen product stream has a carbon life cycle emission less than 1.5 Kg of carbon dioxide equivalent per Kg of hydrogen. Embodiment 16 is the method of embodiment 15, further comprising flowing the low carbon life cycle emission hydrogen to a pressure swing absorber unit, and removing, by the pressure swing absorber unit, impurities from the low carbon life cycle emission hydrogen to produce a purified low carbon hydrogen product comprising at least 99.9 mole percent hydrogen. Embodiment 17 is the method of embodiment 15, further comprising flowing the low carbon life cycle emission hydrogen to a methanation unit, and reacting carbon monoxide and carbon dioxide in the low carbon life cycle emission hydrogen to produce methane and thereby reducing the carbon monoxide and carbon dioxide content to below 0.15 mole percent.

Embodiment 18 is a process for producing a low carbon life cycle emission hydrogen product using a partial oxidation reaction. The process comprises the steps of providing a first feedstock to a partial oxidation reaction unit, wherein the first feedstock comprises at least 65 mole percent renewable propane, wherein the first feedstock is derived from a byproduct produced from a renewable fuel production process, and providing a second feedstock to the partial oxidation reaction unit, where the second feedstock comprises natural gas and fuel gas and comprises at least 80 mole percent methane. The process further comprises the steps of providing a third feedstock to the partial oxidation reaction unit, wherein the third feedstock comprises an oxygen rich stream comprising at least 90 mole percent oxygen, wherein, in the partial oxidation reaction unit, the molar ratio of mono atomic oxygen to carbon is greater than 0.7 and less than 1.4, and contacting the first feedstock, second feedstock, and third feedstock in a reactor of the partial oxidation reaction unit under reaction conditions that include a temperature between 900° C. and 1500° C. and a pressure between 20 Bar and 120 Bar to produce a synthesis gas having a molar ratio of hydrogen ($H_2$) to carbon monoxide (CO) greater than 1.5 and less than 2.5, and comprising less than 2 mole percent methane. The process still further comprises the steps of quenching the synthesis gas, in the partial oxidation reaction unit, with water to a temperature between 120° C. and 300° C. to produce a partial oxidation reaction unit effluent comprising the synthesis gas and the water from the quenching, and providing the partial oxidation reaction unit effluent from the partial oxidation reaction unit to a shift converter unit. In addition, the process comprises reacting, in the shift converter unit, carbon monoxide and water of the partial oxidation reaction unit effluent, to produce a shifted synthesis gas comprising hydrogen and carbon dioxide, wherein the conversion of carbon monoxide in the synthesis gas routed to the shift converter unit is greater than 92 mole percent and the carbon monoxide content of the shifted synthesis gas exiting the shift converter unit is less than 3 mole percent. The process also comprises cooling the shifted synthesis gas in a series of heat exchangers to recover energy for production of steam, providing the shifted synthesis gas exiting the shift converter unit to an absorber unit, and removing carbon dioxide from the shifted synthesis gas using an absorbent to produce a carbon dioxide rich absorbent and the low carbon life cycle emission hydrogen product, wherein the carbon dioxide rich absorbent comprises a mixture of the absorbent and absorbed carbon dioxide. The process yet further comprises regenerating, by heating to liberate the carbon dioxide from the carbon dioxide rich absorbent, to produce carbon dioxide lean absorbent and a carbon dioxide product stream, and recycling the carbon dioxide lean absorbent to the absorber unit. Still further, the process comprises compressing the carbon dioxide product stream for sequestration, and recovering the low carbon life cycle emission hydrogen product from the absorber unit, wherein the low carbon life cycle emission hydrogen product has a purity greater than 88 mole percent and contains less than 0.6 mole percent carbon monoxide and has a carbon life cycle emission less than 1.5 Kg of carbon dioxide equivalent per Kg of hydrogen. Embodiment 19 is the process of embodiment 18, further comprising flowing the low carbon life cycle emission hydrogen product to a pressure swing absorber unit, and removing, by the pressure swing absorber unit, impurities from the low carbon life cycle emission hydrogen product to produce a purified low carbon hydrogen comprising at least 99.9 mole percent hydrogen. Embodiment 20 is the process of embodiment 18, further comprising flowing the low carbon life cycle emission hydrogen product to a methanation unit, and reacting carbon monoxide and carbon dioxide in the low carbon life cycle emission hydrogen product to produce methane and thereby reducing the carbon monoxide and carbon dioxide content to below 0.15 mole percent.

The systems and processes described herein can also include various equipment that is not shown and is known to one of skill in the art of chemical processing. For example, some controllers, piping, computers, valves, pumps, heaters, thermocouples, pressure indicators, mixers, heat exchangers, and the like may not be shown.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method of producing hydrogen from a mixture comprising methane and renewable propane, the method comprising:

contacting methane ($CH_4$) and LPG, where the LPG comprises at least 65 mole percent of renewable propane, with oxygen in a partial oxidation reaction unit, wherein the mole ratio of methane to renewable propane (methane:renewable propane) in the partial oxidation reaction unit is in a range of 2:1 to 12:1;

reacting the methane and the renewable propane with the oxygen, wherein the molar ratio of mono atomic oxygen to carbon is greater than 0.7 and less than 1.4, in the partial oxidation reaction unit, wherein reaction conditions include a temperature in a range of 900° C. to 1500° C. and a pressure in a range of 20 Bar to 120 Bar to produce a synthesis gas comprising carbon monoxide (CO) and hydrogen ($H_2$), wherein the synthesis gas has a molar ratio of $H_2$ to CO greater than 1.5 and less than 2.5, and containing less than 2 percent methane;

quenching the synthesis gas to a temperature in a range of 120° C. to 300° C. to produce a quenched synthesis gas;

flowing the quenched synthesis gas to a shift converter unit;

reacting, in the shift converter unit, the carbon monoxide of the quenched synthesis gas with water to produce carbon dioxide ($CO_2$) and additional hydrogen ($H_2$) such that a shift converter unit effluent comprises more free hydrogen by weight than free hydrogen in the quenched synthesis gas, wherein conversion of carbon monoxide in the quenched synthesis gas is greater than 92 percent and carbon monoxide content of the shift converter unit effluent is less than 3 percent;

cooling the shift converter unit effluent to a temperature less than 65.5° C. to produce an absorber feed and steam, wherein the cooling of the shift converter unit effluent is carried out in a series of heat exchangers, thereby recovering heat and wherein the steam is provided to a process unit that uses steam generated by burning fossil fuel such that the process unit utilizes less steam generated by burning of the fossil fuel;

removing carbon dioxide from the absorber feed, in an absorber unit, via an absorption process that forms a mixture, to produce (1) a hydrogen product stream comprising 88 to 100 mole percent hydrogen and less than 0.6 mole percent carbon monoxide and (2) a carbon dioxide product stream comprising 85 to 100 mole percent carbon dioxide, wherein the absorber feed is contacted with an alcohol in the absorber unit to produce a carbon dioxide rich absorbent, wherein the carbon dioxide rich absorbent comprises a mixture of the alcohol and absorbed carbon dioxide;

flowing the carbon dioxide rich absorbent to a regeneration unit;

heating the carbon dioxide rich absorbent such that carbon dioxide is released from the carbon dioxide rich absorbent and thereby forming the carbon dioxide product stream and alcohol;

flowing the alcohol to the absorber unit for reuse, wherein the recovered heat is used in the regeneration unit for the heating of the carbon dioxide rich absorbent;

compressing the carbon dioxide product stream for sequestration to a pressure greater than 60 Bar; and sequestering the carbon dioxide product stream, wherein the hydrogen of the hydrogen product stream has a carbon life cycle emission less than 1.5 Kg of carbon dioxide equivalent per Kg of hydrogen, wherein power used to compress the carbon dioxide product stream to a sequestration pressure is below 120 kW-hrs per metric ton of carbon dioxide.

2. The method of claim 1, wherein the sequestering of the carbon dioxide product stream results in at least 85% of carbon atoms contained in the synthesis gas being sequestered.

3. The method of claim 1, wherein the LPG is a liquid byproduct of a process that produces a renewable fuel.

4. The method of claim 3, wherein the renewable fuel comprises renewable diesel and/or sustainable aviation fuel (SAF) and/or synthetic paraffinic kerosene (SPK).

5. The method of claim 3, wherein the LPG is 3 to 12 wt. % of renewable feed used to produce the renewable fuel.

6. The method of claim 1 wherein the partial oxidation reaction unit is operated such that it has a space velocity sufficient to convert at least 96 mole percent of the methane and LPG, collectively, to produce the synthesis gas.

7. The method of claim 1, wherein the carbon dioxide product stream leaving the regeneration unit is at a pressure greater than 6 Bar.

8. The method of claim 1, further comprising:

flowing at least a portion of the hydrogen product stream to a pressure swing absorber unit; and removing, by the pressure swing absorber unit, impurities from the at least a portion of the hydrogen product stream to produce a purified hydrogen product stream comprising at least 99.9 mole percent hydrogen.

9. The method of claim 1, further comprising:

flowing at least a portion of the hydrogen product stream to a methanation unit; and reacting carbon monoxide and carbon dioxide in the at least a portion of the hydrogen product stream to produce methane and thereby reducing the carbon monoxide and carbon dioxide content to below 0.15 mole percent.

10. A method of producing a low carbon life cycle emission hydrogen from a mixture comprising methane and renewable propane, the method comprising:

contacting the methane ($CH_4$) and the renewable propane, where the renewable propane comprises at least 50 mole percent of renewable propane, with oxygen in a partial oxidation reaction unit, wherein the ratio of methane to renewable propane (methane:renewable propane) in the partial oxidation reaction unit is in a range of 2:1 to 12:1;

reacting the methane and the renewable propane with the oxygen, wherein the molar ratio of mono atomic oxygen to carbon is greater than 0.7 and less than 1.4, in the partial oxidation reaction unit, wherein reaction conditions include a temperature in a range of 900° C. to 1500° C. and a pressure in a range of 20 Bar to 120 Bar to produce a synthesis gas comprising carbon monoxide (CO) and hydrogen ($H_2$), having a molar ratio of $H_2$ to CO greater than 1.5 and less than 2.5, and containing less than 2 mole methane;

quenching the synthesis gas to a temperature in a range of 120° C. to 300° C. to produce a quenched synthesis gas;

flowing the quenched synthesis gas to a shift converter unit;

reacting, in the shift converter unit, the carbon monoxide of the quenched synthesis gas with water to produce carbon dioxide ($CO_2$) and additional hydrogen ($H_2$) such that a shift converter unit effluent comprises more hydrogen by weight than hydrogen in the quenched synthesis gas, wherein conversion of carbon monoxide in the quenched synthesis gas is greater than 92 percent and carbon monoxide content of the shift converter unit effluent is less than 3 percent;

cooling the shift converter unit effluent to a temperature less than 65.5° C. to produce an absorber feed and steam, wherein the cooling of the shift converter unit effluent is carried out in a series of heat exchangers, thereby recovering heat and wherein the steam is provided to a process unit that uses steam generated by burning fossil fuel such that the process unit utilizes less steam generated by burning of the fossil fuel;

removing carbon dioxide from the absorber feed, in an absorber unit, via an absorption process that forms a mixture, to produce (1) a hydrogen product stream comprising a low carbon life cycle emission hydrogen having 88 to 100 mole percent hydrogen and less than 0.6 mole percent carbon monoxide and (2) a carbon dioxide product stream comprising 85 to 100 mole percent carbon dioxide, wherein the absorber feed is contacted with an alcohol in the absorber unit to produce a carbon dioxide rich absorbent, wherein the carbon dioxide rich absorbent comprises a mixture of the alcohol and absorbed carbon dioxide;

flowing the carbon dioxide rich absorbent to a regeneration unit;

heating the carbon dioxide rich absorbent such that carbon dioxide is released from the carbon dioxide rich absorbent and thereby forming the carbon dioxide product stream and alcohol;

flowing the alcohol to the absorber unit for reuse, wherein the recovered heat is used in the regeneration unit for the heating of the carbon dioxide rich absorbent;

compressing the carbon dioxide product stream for sequestration to a pressure greater than 60 Bar; and sequestering the carbon dioxide product stream, wherein the low carbon life cycle emission hydrogen of the hydrogen product stream has a carbon life cycle emission less than 1.5 Kg of carbon dioxide equivalent per Kg of hydrogen, wherein power used to compress the carbon dioxide product stream to a sequestration pressure is below 120 KW-hrs per metric ton of carbon dioxide.

11. The method of claim 10, further comprising:

flowing the low carbon life cycle emission hydrogen to a pressure swing absorber unit; and removing, by the pressure swing absorber unit, impurities from the low carbon life cycle emission hydrogen to produce a purified low carbon hydrogen product comprising at least 99.9 mole percent hydrogen.

12. The method of claim 10, further comprising:

flowing the low carbon life cycle emission hydrogen to a methanation unit; and reacting carbon monoxide and carbon dioxide in the low carbon life cycle emission hydrogen to produce methane and thereby reducing the carbon monoxide and carbon dioxide content to below 0.15 mole percent.

13. A process for producing a low carbon life cycle emission hydrogen product from a mixture comprising methane and renewable propane using a partial oxidation reaction, the process comprising steps of:

providing a first feedstock to a partial oxidation reaction unit, wherein the first feedstock comprises at least 65 mole percent renewable propane, wherein the first feedstock is derived from a byproduct produced from a renewable fuel production process;

providing a second feedstock to the partial oxidation reaction unit, where the second feedstock comprises natural gas and fuel gas and comprises at least 80 mole percent methane;

providing a third feedstock to the partial oxidation reaction unit, wherein the third feedstock comprises an oxygen rich stream comprising at least 90 mole percent oxygen, wherein, in the partial oxidation reaction unit, the molar ratio of mono atomic oxygen to carbon is greater than 0.7 and less than 1.4;

contacting the first feedstock, second feedstock, and third feedstock in a reactor of the partial oxidation reaction unit under reaction conditions that include a temperature between 900° C. and 1500° C. and a pressure between Bar 20 Bar and 120 Bar to produce a synthesis gas having a molar ratio of hydrogen (H₂) to carbon monoxide (CO) greater than 1.5 and less than 2.5, and comprising less than 2 mole percent methane;

quenching the synthesis gas, in the partial oxidation reaction unit, with water to a temperature between 120° C. and 300° C. to produce a partial oxidation reaction unit effluent comprising the synthesis gas and the water from the quenching;

providing the partial oxidation reaction unit effluent from the partial oxidation reaction unit to a shift converter unit;

reacting, in the shift converter unit, carbon monoxide and water of the partial oxidation reaction unit effluent, to produce a shifted synthesis gas comprising hydrogen and carbon dioxide, wherein conversion of carbon monoxide in the synthesis gas routed to the shift converter unit is greater than 92 mole percent and carbon monoxide content of the shifted synthesis gas exiting the shift converter unit is less than 3 mole percent;

cooling the shifted synthesis gas in a series of heat exchangers to recover energy for production of steam and providing the steam to a process unit that uses steam generated by burning fossil fuel such that the process unit utilizes less steam generated by burning the fossil fuel;

providing the shifted synthesis gas exiting the shift converter unit to an absorber unit;

removing carbon dioxide from the shifted synthesis gas using an absorbent to produce a carbon dioxide rich absorbent and the low carbon life cycle emission hydrogen product, wherein the carbon dioxide rich absorbent comprises a mixture of the absorbent and absorbed carbon dioxide;

regenerating, by heating to liberate the carbon dioxide from the carbon dioxide rich absorbent, to produce alcohol and a carbon dioxide product stream;

recycling the alcohol to the absorber unit;

compressing the carbon dioxide product stream for sequestration; and recovering the low carbon life cycle emission hydrogen product from the absorber unit, wherein the low carbon life cycle emission hydrogen product has a purity greater than 88 mole percent and contains less than 0.6 mole percent carbon monoxide and has a carbon life cycle emission less than 1.5 Kg of carbon dioxide equivalent per Kg of hydrogen, wherein power used to compress the carbon dioxide product stream to a sequestration pressure is below 120 kW-hrs per metric ton of carbon dioxide.

14. The process of claim 13, further comprising:

flowing the low carbon life cycle emission hydrogen product to a pressure swing absorber unit; and removing, by the pressure swing absorber unit, impurities from the low carbon life cycle emission hydrogen product to produce a purified low carbon hydrogen comprising at least 99.9 mole percent hydrogen.

15. The process of claim 13, further comprising:

flowing the low carbon life cycle emission hydrogen product to a methanation unit; and reacting carbon monoxide and carbon dioxide in the low carbon life cycle emission hydrogen product to produce methane and thereby reducing the carbon monoxide and carbon dioxide content to below 0.15 mole percent.

* * * * *